Figure 1:
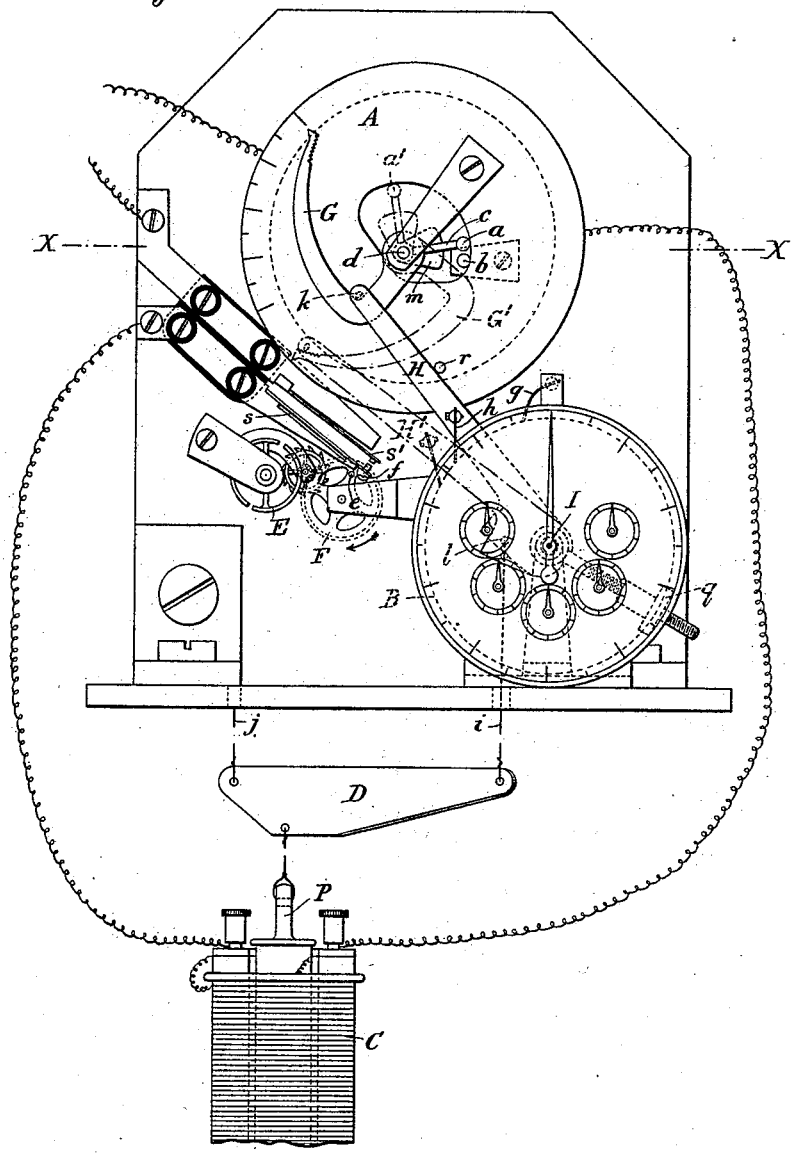

(No Model.) 3 Sheets—Sheet 1.

W. FRIESE-GREENE.
APPARATUS FOR MEASURING ELECTRICITY.

No. 528,870. Patented Nov. 6, 1894.

Witnesses:
S. M. Dosett,
R. E. Somes.

Inventor:
W. Friese-Greene,
By J. E. Somes,
Attorney.

(No Model.)  3 Sheets—Sheet 2.

W. FRIESE-GREENE.
APPARATUS FOR MEASURING ELECTRICITY.

No. 528,870.  Patented Nov. 6, 1894.

(No Model.) 3 Sheets—Sheet 3.
W. FRIESE-GREENE.
APPARATUS FOR MEASURING ELECTRICITY.
No. 528,870. Patented Nov. 6, 1894.

Witnesses:
S. M. Dorsett
R. E. Somes.

Inventor:
W. Friese-Greene
By F. C. Somes,
Attorney.

UNITED STATES PATENT OFFICE.

WILLIAM FRIESE-GREENE, OF LONDON, ENGLAND, ASSIGNOR OF ONE-HALF TO CHARLES BRAWN, OF SAME PLACE.

APPARATUS FOR MEASURING ELECTRICITY.

SPECIFICATION forming part of Letters Patent No. 528,870, dated November 6, 1894.

Application filed March 28, 1894. Serial No. 505,482. (No model.) Patented in England November 5, 1892, No. 19,959.

*To all whom it may concern:*

Be it known that I, WILLIAM FRIESE-GREENE, a subject of the Queen of Great Britain, residing at No. 39 King's Road, Chelsea, London, England, have invented new and useful Improvements in Means or Apparatus for Measuring Electricity (for which I have obtained a patent in Great Britain, No. 19,959, bearing date November 5, 1892,) of which the following is a specification.

My invention has reference to the measurement of electricity and especially to measuring the aggregate amount of electric current which has flowed through a given circuit at a constant or uniform voltage or pressure. For this purpose I construct a meter or measuring apparatus as follows:

In the circuit through which the current to be measured is flowing an ammeter is connected for the purpose of measuring the number of ampères passing through the meter at any given moment. I cause the moving part of the ammeter to be actuated not by attraction but by repulsion and in order to effect this I preferably fix within the core or solenoid a rod, bar or plate parallel with the axis of same, and I mount upon pivots another rod, bar or plate parallel with the said fixed rod, bar or plate. Consequently as the north pole of the fixed rod, bar or plate will be opposite the north pole of the pivoted rod, bar or plate and the south poles of the two rods, bars or plates will be opposite each other, and as like poles repel each other, it follows that the pivoted rod will be repelled from the fixed rod, and that the extent of repulsion at any given moment will depend upon the number of ampères then passing through the ammeter. My invention, however, is not limited to the use of an ammeter constructed as above explained or to the use of an ammeter acting by repulsion, although as regards sensibility and range such an ammeter possesses great advantages over one acting by attraction.

To a moving part of the ammeter which in the case of the ammeter above described would preferably be the arbor or axis of the pivoted rod, bar or plate, I attach a plate shaped to a suitable curve. The position of this curved plate at any given moment will thus represent the strength of the current then flowing through the meter.

The meter is provided with clockwork mechanism capable of moving regularly at a given rate, and this clockwork mechanism may be wound up periodically by means of a plunger and solenoid the said solenoid having a very high electrical resistance, and being connected between the main leads as a shunt circuit which is temporarily completed by means of the mechanism at constantly recurring intervals.

In connection with the clockwork mechanism I employ an arm or lever, which is at regularly recurring periods made to turn about a pivot once, to and fro to a greater or less degree. This periodical turning movement of the lever or arm is preferably effected by connecting it with the plunger or core of a coil or solenoid which is not normally connected with the circuit but becomes temporarily connected therewith at stated intervals by a suitable contact piece on a moving part of the clockwork, and when so connected the plunger is drawn into the coil and the lever or arm makes its turning movement. The plunger and solenoid for giving the periodical turning movement to the lever or arm may with advantage be the same as those by means of which the clockwork mechanism is periodically wound up as hereinbefore explained. Alternatively the said coil or solenoid may be normally connected with the circuit and be temporarily disconnected therefrom at stated intervals, so that when so disconnected the lever or arm makes its turning movement and the clockwork mechanism is wound up. Now the extent to which the lever or arm turns on its fulcrum is determined by the position of the curved plate hereinbefore described against which a pin or projection of the lever strikes and which therefore limits its movement. The curved plate is so shaped as to allow the motion of the lever to vary as the current passing through the solenoid varies. The lever is connected by means of very delicate ratchet work with a counting or integrating apparatus similar to that employed in an ordinary gas meter. In this manner the counting apparatus will at regular intervals record a movement commensurate with the amount of current flowing at the time.

It will be understood that in the apparatus above described no part of the clockwork mechanism ever comes into direct contact with the lever or arms.

I also provide for automatically stopping and starting the clockwork mechanism as the current ceases or commences to flow. For this purpose a spring or other metal piece may be connected with an electro-magnet connected with the circuit so that when no current is passing through the said magnet the spring or other metal piece will act as a stop or clutch and prevent the mechanism moving. When, on the other hand, the current is turned on the metal piece is drawn toward the magnet and allows the mechanism to move.

The accompanying drawings represent an apparatus constructed according to my invention.

Figure 2:
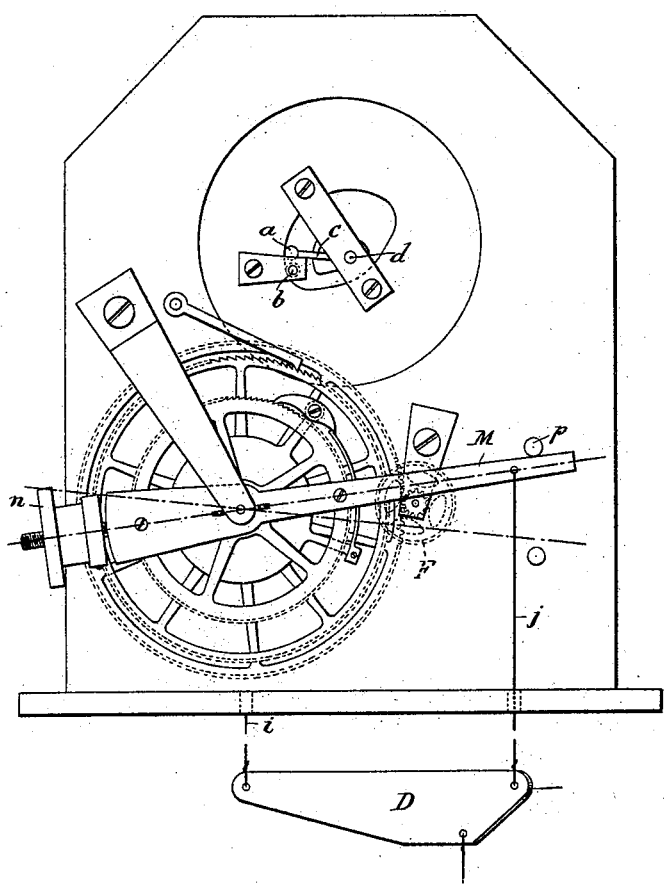
Figure 3:
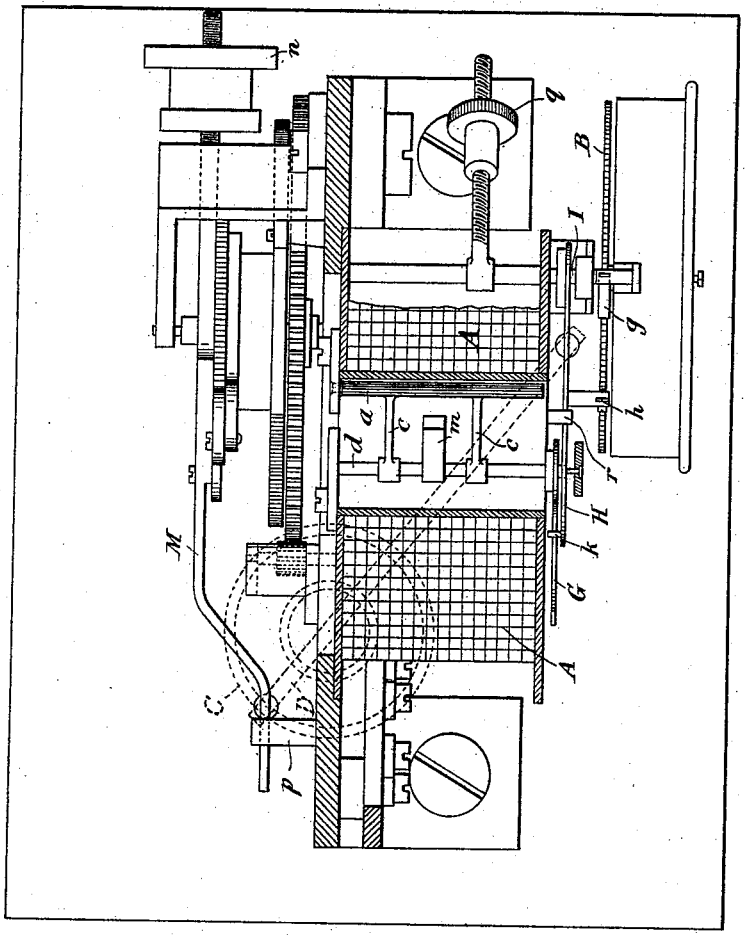

Figure 1 is a front view, Fig. 2 a back view and Fig. 3 a sectional plan on the line X, X, of Fig. 1, part of the coil of the main solenoid or ammeter being also broken away to show the pivot of the lever or arm which moves the counting or integrating apparatus.

A is the main solenoid placed in the circuit through which the current to be measured is flowing. Within this solenoid and parallel to the axis of same is fixed a rod $b$. There is also within the solenoid A and parallel with the fixed rod $b$ another rod $a$ connected by arms $c, c$, to an arbor or axis $d$. As the north poles of the two rods $a$ and $b$ are opposite each other and their south poles are also opposite each other the pivoted rod $a$ will be repelled from the fixed rod $b$ and the amount of repulsion at any given moment will depend upon the number of ampères then passing through the solenoid which therefore in conjunction with the rods $a$ and $b$ constitutes an ammeter. The use in apparatus for measuring the aggregate amount of electric current which has flowed through a given circuit at a constant or uniform voltage or pressure of an ammeter the moving part of which is actuated by repulsion in contradistinction to an ammeter in which the moving part is actuated by attraction is a characteristic feature of my invention. As I have already hereinbefore stated it possesses great advantages as regards sensibility and range and I do not limit myself to the particular form shown in the drawings, as it is obvious that an ammeter adapted for the purpose of my invention and actuated by repulsion may be arranged otherwise than as shown. My invention moreover does not preclude the use in my apparatus of an ammeter actuated by attraction.

The movable rod $a$ is so adjusted by a weight $m$ (or it might be a spring) that when no current is passing it almost touches the fixed rod $p$ as seen in Fig. 1.

To the arbor $d$ of the movable rod $a$ is attached a curved plate G the position of which at any given moment will represent the strength of the current then flowing through the ammeter.

E represents the escapement or escape wheel of clockwork mechanism moving regularly at a given speed. It is wound up periodically by means of a plunger P and solenoid C having a very high electrical resistance and connected between the main leads as a shunt circuit as clearly indicated in Fig. 1, the shunt circuit being temporarily completed by means of the clockwork mechanism at constantly recurring intervals. This temporary and periodical completion of the shunt circuit is effected as follows:—On the wheel F of the clockwork which wheel revolves once in a minute (or other given period) is a pin $e$ which at every revolution comes against and forces back a cam or projection $f$ on an insulated spring $s$ and thereby causes this spring to make contact with another insulated spring $s'$ and thus complete the circuit or metallic connection between the main leads and the coil of the solenoid C. When the shunt circuit is thus temporarily completed the plunger P is drawn into the solenoid C and pulls down a cross bar D which is connected by a silk cord or thread $j$ to a clockwork lever M (which is similar to those ordinarily used in musical boxes). The lever M is therefore pulled down and winds up the clockwork. The lever is subsequently returned to its normal position by its counterweight $n$, a stop $p$ limiting the return movement.

H is a lever or arm in connection with the counting mechanism and balanced by means of the counterweight $q$. This lever is at regularly recurring periods made to turn about its pivot I. This periodical turning movement is shown as being effected by means of the same plunger P and solenoid C as those which actuate the clockwork lever M, that is to say the cross bar D is connected by a silk cord or thread $i$ to the lever H at $l$ so that this lever is pulled down every time the plunger P is drawn into the solenoid C on the completion of the shunt circuit. The extent to which the lever H turns on its fulcrum each time it is actuated is determined by the position for the time being of the curved plate G against which a V-shaped stud $k$ on the lever strikes, the curved plate limiting the movement. The curved plate has teeth or serrations on its inner edge for the purpose of preventing the stud $k$ slipping along it and thereby altering its position. The dotted lines G' in Fig. 1, indicate the position of the curved plate G when the rod $a$ has by repulsion been moved (for example) to the position $a'$ and the dotted lines H' indicate the position of the lever H when it has been turned by the action of the plunger P so as to come against the plate G in the position G'. When the shunt circuit is broken the lever H is returned to its normal position by the counterweight $q$, a stop $r$ limiting the return movement.

The lever H carries a pawl or click h, which in every turning movement in the one direction of the lever turns the ratchet wheel B to an extent depending upon the extent of the movement of the said lever. g is a stop pawl to prevent the return movement of the wheel B. This wheel is the first wheel of a counting or integrating apparatus similar to that employed in an ordinary gas meter. The counting apparatus will thus at regular intervals record a movement commensurate with the amount of current flowing at the time.

A scale can be placed on the face of the ammeter or solenoid A in the path of the end of the curved plate G so that the amount of current passing at any instant may be read. The solenoid A should be wound with suitable coarse wire; or it may be wound with copper tape.

I have already stated that the clockwork mechanism is automatically stopped and started as the current ceases or commences to flow and that this can be effected by means of a spring or other metal piece connected with an electro-magnet which is connected with the circuit so that when no current is passing through the magnet the metal piece acts as a stop or clutch to prevent the mechanism moving, and when on the other hand the current is turned on the metal piece is drawn toward the electro-magnet and allows the mechanism to move. This part of the apparatus will be readily understood without illustration or further explanation.

What I claim as my invention, and desire to secure by Letters Patent, is—

1. In an apparatus for measuring electricity, the combination of a solenoid in the main circuit, a fixed rod and a movable rod parallel with the axis of said solenoid, said movable rod being adapted to be repulsed by said fixed rod, a curved arm connected to said movable rod, a solenoid provided with a plunger, mechanism for operating said plunger, and a bar sliding on said curved arm and operated by said plunger for registering the current.

2. In an apparatus for measuring electricity, the combination of a solenoid, a stationary rod parallel with the axis of said solenoid, a movable rod also pivoted near the axis of said solenoid and adapted to be repulsed by said stationary rod, a curved arm attached to said movable rod, a bar sliding on said curved arm and provided with a pawl, a solenoid provided with a plunger for operating said bar, mechanism for operating said plunger and mechanism operated by the pawl on said arm for registering the current.

3. In an apparatus for measuring electricity, the combination of a core or solenoid located in the main circuit, a fixed and a movable rod adjacent to said solenoid, a curved arm on said movable rod provided with teeth at its outer end, a solenoid provided with a plunger, clock-work mechanism for operating said plunger, a bar provided with a stud adapted to slide on said curved arm, said stud meshing with the teeth on said arm, said bar being operated by said plunger.

W. FRIESE-GREENE.

Witnesses:
HARRY A. McLELLAN,
W. J. FERRY.